(12) United States Patent
Bartlett

(10) Patent No.: US 9,544,738 B1
(45) Date of Patent: Jan. 10, 2017

(54) AUTOMATICALLY GENERATING AND MAINTAINING A FLOOR PLAN

(71) Applicant: Google Inc., Mountain View, CA (US)

(72) Inventor: Scott Bartlett, Oakland, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/086,270

(22) Filed: Mar. 31, 2016

Related U.S. Application Data

(63) Continuation of application No. 13/893,680, filed on May 14, 2013, now Pat. No. 9,307,368.

(51) Int. Cl.
*H04W 4/04* (2009.01)
*G01S 5/02* (2010.01)

(52) U.S. Cl.
CPC ............ *H04W 4/04* (2013.01); *G01S 5/0252* (2013.01)

(58) Field of Classification Search
CPC ..................................................... H04W 4/04
USPC ................ 455/414.1, 456.1, 456.2, 456.3, 456.5, 455/456.6
See application file for complete search history.

(56) References Cited

U.S. PATENT DOCUMENTS

| | | | |
|---|---|---|---|
| 6,972,682 B2 | 12/2005 | Lareau et al. | |
| 7,502,619 B1 | 3/2009 | Katz | |
| 2005/0094610 A1 | 5/2005 | De Clerq et al. | |
| 2006/0095170 A1* | 5/2006 | Yang | G05D 1/0246 701/23 |
| 2006/0179355 A1 | 8/2006 | Bouchard | |
| 2007/0232319 A1 | 10/2007 | Bells et al. | |
| 2007/0271011 A1* | 11/2007 | Lee | G05D 1/0242 700/245 |
| 2008/0157957 A1* | 7/2008 | Pitchers | H05B 37/0272 340/539.1 |
| 2010/0099410 A1 | 4/2010 | Sweeney et al. | |
| 2011/0018732 A1* | 1/2011 | Cho | G01S 5/0236 340/8.1 |
| 2011/0178669 A1* | 7/2011 | Tanaka | G05D 1/0272 701/25 |
| 2011/0254683 A1 | 10/2011 | Soldan et al. | |
| 2011/0260922 A1 | 10/2011 | Zhang et al. | |
| 2012/0021762 A1 | 1/2012 | Garin et al. | |
| 2012/0087212 A1 | 4/2012 | Vartanian et al. | |
| 2012/0166437 A1* | 6/2012 | Esteve Balducci | G01C 21/206 707/736 |
| 2012/0191287 A1* | 7/2012 | Shin | G05D 1/027 701/28 |
| 2013/0109413 A1 | 5/2013 | Das et al. | |

(Continued)

OTHER PUBLICATIONS

Apple Inc., "Find My iPhone app", iTunes Preview. Available at https://itunes.apple.com/us/app/find-my-iphone/id376101648?mt=8.

(Continued)

*Primary Examiner* — Christopher M Brandt
(74) *Attorney, Agent, or Firm* — Morris & Kamlay LLP

(57) ABSTRACT

Systems and techniques for automatically obtaining data indicating the locations of wireless devices and physical objects within a region are provided. An autonomous mobile platform may survey a region with a wireless signal strength sensor and/or a physical environment sensor. The signal strength data and the spatial data are used to generate a map that indicates the locations of wireless devices within a region such as a home or office. The map may be automatically generated and/or updated in the course of other operations performed by an autonomous mobile platform.

20 Claims, 2 Drawing Sheets

(56) References Cited

U.S. PATENT DOCUMENTS

| | | |
|---|---|---|
| 2013/0122935 A1 | 5/2013 | Das et al. |
| 2013/0157683 A1 | 6/2013 | Lymberopoulos et al. |
| 2013/0196684 A1 | 8/2013 | Dong et al. |
| 2013/0290338 A1 | 10/2013 | Lee et al. |
| 2014/0018112 A1 | 1/2014 | Cohen-Zur et al. |
| 2014/0039943 A1 | 2/2014 | Ghindici et al. |
| 2014/0045515 A1 | 2/2014 | Austin et al. |
| 2014/0148196 A1 | 5/2014 | Bassan-Eskenazi et al. |
| 2014/0171118 A1 | 6/2014 | Marti et al. |
| 2014/0295878 A1 | 10/2014 | Yang et al. |
| 2014/0323148 A1 | 10/2014 | Schmalstieg et al. |

OTHER PUBLICATIONS

Swangmuang, "A Location Fingerprint Framework Towards Efficient Wireless Indoor Positioning Systems", Dissertation for Doctor of Philosophy submitted to the School of Information Sciences at the University of Pittsburgh., 2008.

* cited by examiner

AUTOMATICALLY GENERATING AND MAINTAINING A FLOOR PLAN

BACKGROUND

There is growing trend in expanding the reach of location-specific computer networks throughout the home and other locales. For example, home gateways have been developed to provide automation throughout the home. Centralized automation systems typically provide an interface that enables various electronic products and appliances to connect to the network to share data and interact with one another.

For example, consumers who have automated their home typically are able to control wireless devices within the home. There are various home appliances that may be connected to the home automation system such as TVs, refrigerators, washing machines, microwave ovens, air-conditioners, and the like. Other electronic products include less obvious devices such as light fixtures, routers, and any other devices that operate on wireless protocols. Similarly, various items may be connected within other centralized automation systems, such as hospital equipment, inventory control systems, physical plant management systems, and the like.

BRIEF SUMMARY

The present disclosure is directed to methods for an autonomous platform to survey a region such as a home, office, physical plant, hospital, outdoor environment, or the like, and create a map of the region. The map may include both the wireless devices and the physical objects within the region. In an implementation, an autonomous mobile platform having at least one wireless signal strength sensor and a physical environment sensor may survey a region. Signal strength data for a wireless device in the region may be obtained from the wireless signal strength sensor. Similarly, spatial data for the region may be obtained from the physical environment sensor. Spatial and wireless data also may be obtained by monitoring the position of the autonomous mobile platform as it patrols, and/or based upon signal strength information contained in communication between the autonomous mobile platform and one or more wireless devices. The signal strength data and the spatial data may be provided to a centralized automation system, such as a home automation system. The signal strength data may include a wireless device identifier, signal-to-noise ratio, packet loss rate, or any other unique measure in radio signal space used for location determination. Spatial data may be absolute or relative position, and may be described using angular position, range, direction, absolute or relative coordinates, or any other suitable indication of physical position.

In an implementation of the disclosed subject matter, a system may receive spatial data of a region and signal strength data for a wireless device in the region from an autonomous mobile platform. A map of the region may be generated based upon the spatial data received. The map may indicate the location of the wireless device in the region. The location of the wireless device may be determined based on the signal strength data received. The map may be updated to reflect differential spatial data and differential signal strength data received from the autonomous platform.

In an implementation, a centralized automation system may receive a map indicating the location of the wireless device in the region. The map may be a topographical map, a geographical map, a floor plan, a listing of devices organized by regions, or other related maps for indicating the location of the wireless devices in the region.

Additional features, advantages, and implementations of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Implementations disclosed herein relate generally to systems and techniques for mapping wireless devices within a region. More specifically, implementations disclosed herein may allow for autonomously generating a map of a home or other region that indicates the location and identification of wireless devices for later automation use. Autonomous devices include devices that can perform desired tasks in unstructured environments without continuous human guidance.

Figure 1:
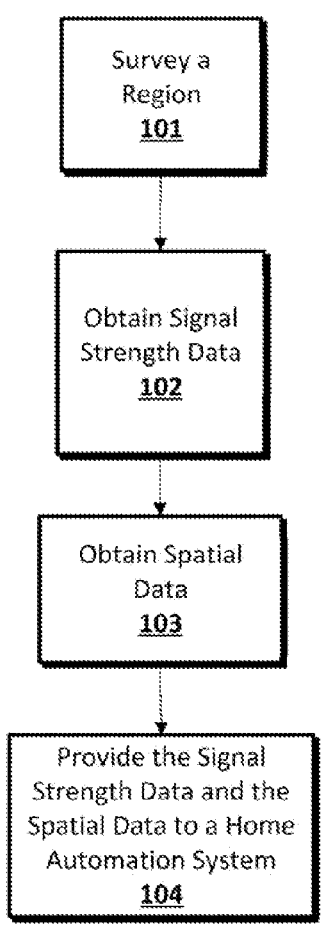
FIG. 1 is a flow chart illustrating a method for obtaining signal strength data and spatial data according to an implementation of the disclosed subject matter.

FIG. 1 shows an example method for obtaining signal strength data from a wireless signal strength sensor and spatial data from a physical environment sensor. In an implementation, at 101, an autonomous mobile platform may survey a region. A region may include, for example an office or office building, a home, a hospital or similar environment, secure areas in which it may be useful to monitor wireless communications, or, more generally, any indoor or outdoor area of any size. In some cases the region may be defined based upon the specific operation of the autonomous mobile platform, such as where a home cleaning device is configured to operate within a specific room, rooms, or portion of a room. The mobile platform may be any autonomous platform, for example, an autonomous vacuum cleaner, delivery platforms, self-driving vehicles, or autonomous monitoring devices, and the like. Autonomous platforms may include devices that can perform desired tasks in unstructured environments without continuous human guidance. For example, an autonomous robotic vacuum cleaner is capable of navigating a living space and common obstacles while vacuuming the floor. Other examples of autonomous devices include platforms capable of position sensing and navigation. These may be found, for example in such fields as industrial robotics, lawn care, and wastewater treatment. An autonomous platform may be capable of working for an extended period without human intervention, gaining information about the environment, and moving all or part of themselves through an operating environment without human assistance.

An autonomous platform may include a signal strength sensor when obtained by the user or the user may add it to an existing platform. The signal strength sensor may allow the autonomous mobile platform to obtain signal strength data for a wireless device in the region at 102. The signal strength data may include a wireless device identifier, signal-to-noise ratio, packet loss rate, or any other measure in radio signal space used for determining information about a wireless device. In some cases, the signal strength data may be obtained from, or as a part of, the underlying signaling mechanism. For example, signal strength data as described herein may include the value of the received signal strength indicator (RSSI) as used in IEEE 802.11x wireless protocols or similar protocol-specific data. As previously described, a mobile platform may autonomously patrol a region. Signal strength data readings may be taken continuously as the platform moves within the region, at regular intervals, and/or when the autonomous mobile platform encounters a natural or artificial marker. For example, the mobile platform may patrol a home, office space, or other region having several rooms. An implementation may measure and/or record signal strength data, for example once in the center of the room, at several locations within the room, such as when changing direction, or continuously as the platform moves within the room. For example, once in the center or near the center of a room, an implementation may employ a signal strength sensor to collect signal strength data for the room. In some configurations, it may be useful to make multiple measurements of signal strength within a region to provide additional accuracy and to reduce or eliminate measurement errors.

A signal strength sensor on the autonomous mobile platform may obtain signal strength data of a wireless device in the region. A wireless device may include any device that communicates over a wireless network accessible to a central automation system. This may include any device connected to a wireless local area network, personal area networks, metropolitan area networks, and wide area networks. For example, wireless devices may include temperature and humidity control components such as an internet-controlled thermostat, automated windows that allow for automated opening and closing, wireless routers, wireless desktop and mobile computers, handheld or portable devices such as smart phones, and the like. Other examples include lighting control systems, which can be used to control household electric lights, a coffeemaker, a garage door, a blender or any household appliance that can be monitored and controlled automatically or remotely.

Once the autonomous mobile platform has patrolled most of or the entire designated region, the signal strength data for each wireless device may be aggregated. For example, signal strength data that indicates it is for a single device, such as via a device identifier associated with the data, may be compiled within a region to determine the location of the device within that region. As a specific example, the signal strength data may be analyzed to triangulate the device's location, and/or to identify a region in which the signal strength is at a maximum, which may then identify the most likely physical location of the associated device. Other techniques of aggregating signal strength data are disclosed elsewhere herein. The signal strength data for each wireless device may also be aggregated continuously as the mobile autonomous device patrols the region, or it may be aggregated after the device has completed patrolling a portion or all of a region. The signal strength data can be used to determine the position information of a wireless device in the region, as described herein.

In an implementation, an autonomous mobile platform may also include a physical environment sensor when obtained by the user or the user may add it to an existing platform. The physical environment sensor may allow the autonomous mobile platform to obtain spatial data for the region at 103. Physical environment sensors may include, for example, infrared detection systems, laser measurement systems, distance measurement systems, stereo cameras, monocular computer vision systems, ultrasonic rangefinders, geo-positioning sensors, radio sensors, and the like. Spatial data may include information regarding physical objects within the physical environment. For example, the physical environment sensor is capable of identifying the location of an open door, a table in the center of the room, a lamp, a refrigerator, a person, a chair or any other physical attributes within the spatial region. Spatial data readings may be taken continuously along the route, at regular intervals and/or when the autonomous mobile platform encounters a natural or artificial marker. Spatial data also may be obtained by tracking the location of the autonomous platform as it moves within a region. For example, an initial position of the platform may be obtained or preset, and subsequent movement of the platform may be tracked to obtain spatial data for the region. Wheel rotation, inertial tracking, or similar techniques may be used to track movement of the platform. As another example, orientation may be determined using absolute position data, such as by use of a compass or similar device, or using relative position data, such as a gyroscope or similar mechanism. The angular position or arrangement of the platform also may be monitored, for example to identify non-level portions of a region, to determine elevation changes as the platform moves within the region, or the like.

Once the autonomous mobile platform has patrolled most of or the entire designated region, the spatial data for physical objects within the physical environment may be aggregated. The spatial data for the physical objects within the physical environment may also be aggregated continuously as the mobile autonomous device patrols the region. Collecting the spatial data allows us to generate a map of the region as described herein.

In an implementation, spatial data and/or signal strength data may be obtained using a combined sensor or other appropriate sensor, such as a directional antenna that obtains a direction of a wireless signal as well as, or separately from, the strength of the wireless signal. Thus, as the platform moves within a region, it may collect directional data that indicates a likely direction in which a wireless device may be found, relative to each point within the region from which the directional data is obtained. Spatial data as disclosed herein may include this directional data, which may be used to locate a wireless device within a region. In some configurations such directional spatial data may be used to determine the location of a wireless device within a region separately from signal strength data obtained for the device.

At 104 the obtained signal strength data and/or the spatial data may be provided to a central automation system such as a home automation system. The central automation system may be located on a mobile device, on the autonomous platform itself, within the region such as a home or office, in a remote location (e.g. within a cloud server), or any combination thereof. The central automation system may use this information to generate a map indicating the location of the wireless devices based on the signal strength data and the spatial data.

Figure 2:
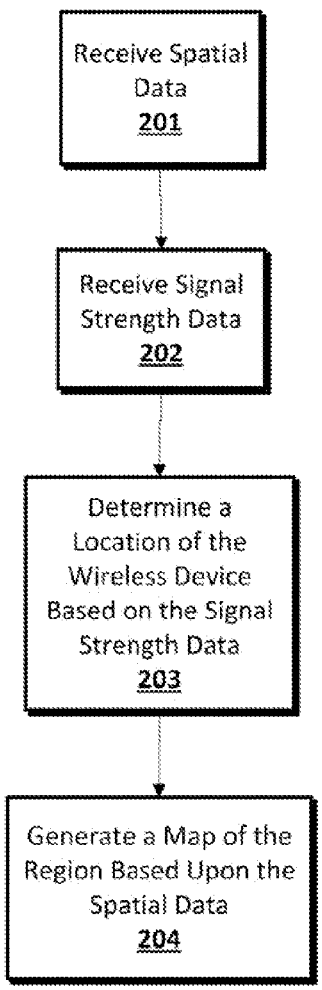
FIG. 2 is a flow chart illustrating a method for determining a location of a wireless device based on signal strength data according to an implementation of the disclosed subject matter.

FIG. 2 shows an example method for determining a location of the wireless device based on the signal strength data. At 201 spatial data of a region may be received and at 202 signal strength data for a wireless device in the region may be received, as previously described. The signal strength data can be used to determine the position information of a wireless device in the region. Similarly, the spatial data allows for accurate mapping of physical objects within the physical environment. An implementation may determine a location of the wireless device 203 based on the signal strength data.

The location of the wireless devices may be determined by associating location-dependent characteristics, such as received signal strength data from multiple access points, to a location, and using these characteristics to determine or infer the location. For example, signal strength data may be represented as one or more signal strength vectors, each of which indicates a magnitude of received signal strength and a direction from which the signal strength was received, which then indicates the likely location of the associated wireless device. The vector direction may be determined, for example, based upon a series of measurements of the signal strength of transmissions sent by the device; if the measurements increase in a direction, it may be presumed that the device is located in that direction. As another example, an autonomous mobile platform may include one or more directional antennas, which can be used to determine the direction from which a wireless signal originates as the device surveys a region. Such directions may be obtained, for example, by rotating either the antenna and/or the device and taking measurements during rotation. Alternatively or in addition, rotation may be performed via mathematical beam forming using multiple antennas. The highest intensity point found then indicates the most likely direction of the signal strength vector. More generally, any suitable technique of triangulation may be used, in which one or more signal strength measurements are combined to identify a likely location and/or direction of a wireless device relative to a position of the autonomous mobile platform. Received signal strength vectors may be collected as the mobile platform patrols a region.

The location of the wireless devices may also be determined by determining the signal strength in the region at a series of locations, and identifying the location of the device based upon the highest signal strength found and/or other trends in the determined signal strengths. For example, a "heat map" may be generated that shows the relative signal strengths measured within an environment. In such a technique, received signal strength data may be collected as the mobile platform patrols a region. The current received signal strength may be compiled and plotted within a two-dimensional representation of the environment to identify peaks or similar trends in the received signal strengths, which indicate the most likely location(s) of wireless devices. Other techniques for identifying the location of a device may include a strongest base station selection method, nearest-neighbor techniques, probabilistic techniques, and any other suitable methods.

As another example, an autonomous platform may operate as a transmitter, and a wireless device within the region may report the signal strength of the autonomous platform. This signal strength data may then be used to determine spatial data for the region, including the location of one or more wireless devices. For example, the indicated signal strength at various positions may be used to construct a heat map as previously described. As another example, the signal strength of the platform-transmitted signal may be combined with directional or other positional information as previously described to determine the relative location of the platform and the wireless device within the region. In general, the autonomous platform may communicate with the wireless device using any suitable protocol, which may include an indication of signal strength. For example, as previously described, an implementation may make use of the 802.11x RSSI values that are passed between devices during routine network communication.

Referring again to FIG. 2, an implementation also may generate a map of the region 204 based upon the spatial data and the location data. The map may indicate the physical location of one or more wireless devices in the region. For example, the central automation system may include a map builder module or component that converts the spatial data for physical objects within the physical environment into a two-dimensional or three-dimensional graphical representation. The map builder may also indicate the location of a wireless device within the graphical representation using the signal strength data. For example, the map builder may create a floor plan of a room indicating the location of a wireless device. The floor plan may include large objects within the room to assist the map-reader locate the wireless devices within a specific room based on the larger landmarks. The map may also be a topographical map, a geographical map, a listing of devices organized by regions, or other related maps for indicating the location of the wireless devices in the region. For example, an implementation may list wireless devices by their wireless device indicators. The wireless devices can be organized by room, e.g. wireless appliances in the kitchen, wireless devices in the living room, etc.

The map may be updated to reflect differential spatial data received from the autonomous mobile platform. For example, if a table were physically removed from the living room to the dining room, the table as indicated in a map would be moved from the region indicating the living room to the region indicating the dining room. The map may be updated to reflect differential signal data received as well. For example, if a wireless device is moved from one region to another, the map will indicate the physical displacement as well. In addition, if the wireless device has a poor connection to the wireless network due to battery depletion, a faulty wireless card, or the like, the map may indicate the wireless device's inability to connect.

Figure 3:
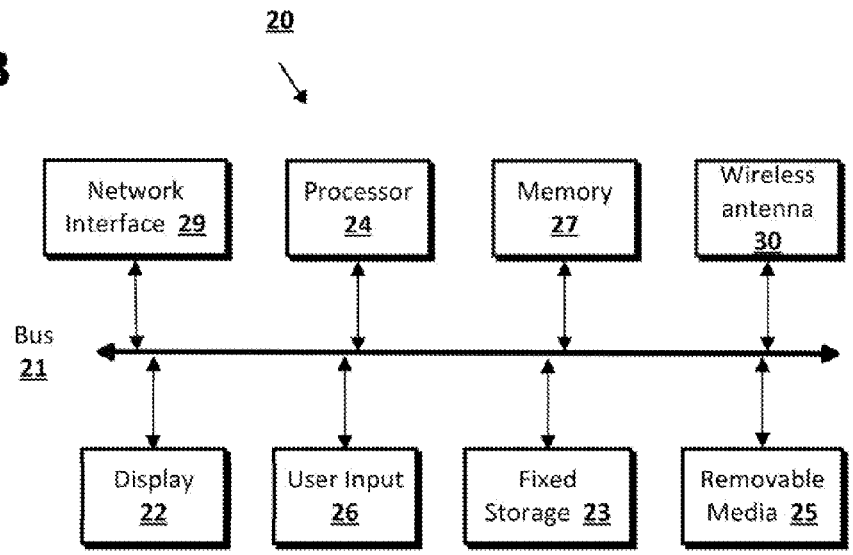
FIG. 3 shows a device according to an embodiment of the disclosed subject matter.

Embodiments of the presently disclosed subject matter may be implemented in and used with a variety of component and network architectures. FIG. 3 is an example device 20 suitable for implementing embodiments of the presently disclosed subject matter. The device 20 includes a bus 21 which interconnects major components of the device 20, such as a central processor 24, a memory 27 (typically RAM, but which may also include ROM, flash RAM, or the like), a user display 22, such as a display screen via a display adapter, a user input interface 26, which may include one or more controllers and associated user input devices such as a keyboard, mouse, and the like, and may be closely coupled to the fixed storage 23, such as a hard drive, flash storage, Fibre Channel network, SAN device, SCSI device, and the like, and a removable media component 25 operative to control and receive an optical disk, flash drive, and the like.

A device 20 may include a wireless antenna 30, which may include a directional antenna.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with the device 20 are generally stored on and accessed via a computer readable medium, such as a hard disk drive (e.g., fixed storage 23), an optical drive, floppy disk, or other storage medium 25.

Figure 4:
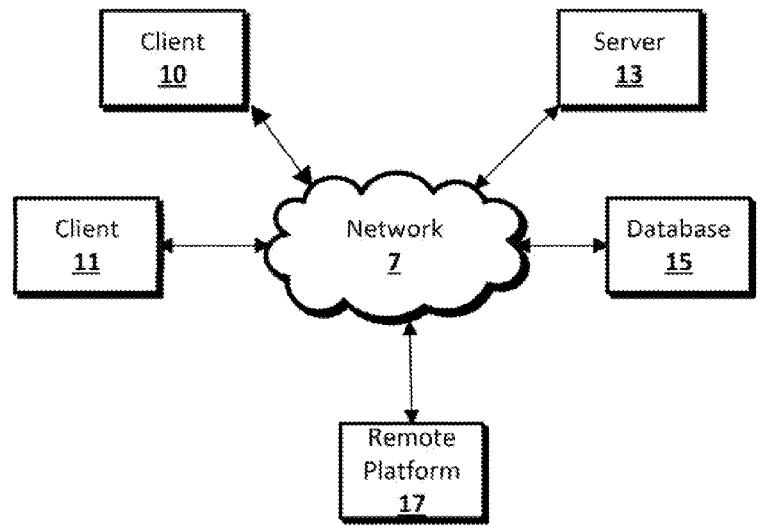
FIG. 4 shows a network configuration according to an embodiment of the disclosed subject matter.

The fixed storage 23 may be integral with the device 20 or may be separate and accessed through other interfaces. A network interface 29 may provide a direct connection to a remote server via a telephone link, to the Internet via an Internet service provider (ISP), a direct connection to a remote server via a direct network link to the Internet via a POP (point of presence), an intranet connection, a direct connection to a remote monitoring location such as a security company, or other technique. The network interface 29 may provide such connection using wireless techniques, including digital cellular telephone connection, Cellular Digital Packet Data (CDPD) connection, digital satellite data connection or the like. For example, the network interface 29 may allow the device to communicate with other devices via one or more local, wide-area, or other networks, as shown in FIG. 4.

In an implementation, an autonomous mobile platform as disclosed herein may be an existing platform to which is attached or integrated a region mapping platform. The region mapping platform may include the various sensors disclosed herein as being integrated with an autonomous mobile platform, and may be attached to an existing autonomous mobile platform. For example, an after-market region mapping platform including the components disclosed herein may be temporarily or permanently affixed to an existing autonomous mobile platform such as a home cleaning device. The mapping platform may remain on the autonomous mobile platform for a period of time sufficient to obtain data as disclosed herein, after which it may be removed. In a specific example, the region mapping platform may be a smart phone, tablet, or similar device configured with software configured to perform the operations disclosed herein.

In an implementation, multiple autonomous mobile platforms and/or region mapping platforms may be used to collect data which can then be used to generate a map as disclosed herein. This may be useful, for example, when multiple autonomous mobile platforms are available, each of which may have different capabilities such as resolution, movement or mapping speed, processing capabilities, sensor types, network connection types, or the like. As a specific example, a central automation system may include or may be in communication with multiple autonomous cleaning devices, such as where one device is resident on each floor of a home or office space. As another example, an office or hospital space may have some devices that are operable regularly or periodically, such as devices that are activated during non-working hours, and other devices that are operated only at irregular, specific, or individually-chosen times, such as where a maintenance device is operated only when a particular part of the office or hospital space is not in use. The central automation system may receive spatial and/or signal strength data for a region from multiple region mapping platforms and use the data to generate a map of the region as disclosed herein. The data from multiple platforms may be combined in any suitable way. For example, the data may be used in whole, as if it was received from a single platform as disclosed herein. As another example, data from one platform may be treated as more precise or reliable, or otherwise may be weighed relative to data from another platform. As another example, the data from each platform may be used to generate an interim map or portion of a map as disclosed herein and the interim maps then may be combined. Any suitable technique known in the art for combining overlapping or related data from multiple sources may be used.

A central automation system as disclosed herein may include one or more general- or specific-purpose computers that have been programmed to manage, control, and/or collect data from one or more other devices within a region. For example, a home automation system may include a central computer system that receives data from one or more devices within a home, via wireless or wired network connections using any suitable communication protocol, as will be readily understood by one of skill in the art. A central automation system typically includes programming that allows the central automation system to send instructions to the connected devices, such as to change the state of a device, request data obtained by the device, or the like. The central automation system also may include or may connect to a user interface, such as a control panel, tablet, smart phone, or other device, that allows the system to provide data to a user, receive instructions or configuration settings from a user, or the like.

Many other devices or components (not shown) may be connected in a similar manner (e.g., document scanners, digital cameras and so on). Conversely, all of the components shown in FIG. 3 need not be present to practice the present disclosure. For example, an autonomous mobile platform may not have a user display 22 because an implementation may provide data directly to a central automation system. As another example, a platform as disclosed herein may have additional antennas or other wireless interfaces and/or additional physical detectors. As another example, such a platform may not include a direct user input component, a removable media component, or other components that are not necessary to perform the various functions disclosed herein. The components can be interconnected in different ways from that shown. The operation of a device such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

FIG. 4 shows an example network arrangement according to an embodiment of the disclosed subject matter. One or more clients 10, 11, such as local computers, smart phones, tablet computing devices, and the like may connect to other devices via one or more networks 7. In an example implementation, a client 10 may be a region mapping platform and/or autonomous mobile platform as disclosed herein. The network may be a local network, wide-area network, the Internet, or any other suitable communication network or networks, and may be implemented on any suitable platform including wired and/or wireless networks. The clients may communicate with one or more servers 13 and/or databases 15, such as a central automation system as disclosed herein. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated. While various implementations of the present disclosure have been described above, it should be understood that they have been presented by way of example and not limitation. It will be apparent to one skilled in the pertinent art that various changes in form and detail can be made therein without departing from the spirit and scope of the present disclosure.

The invention claimed is:

1. A method comprising:
receiving, by a computing device from a mobile platform that is remote from the computing device, a first spatial data in a region;
wherein the mobile platform is configured to navigate the region autonomous from human assistance based on spatial data obtained from a physical environment sensor of the mobile platform;
receiving, by the computing device from the mobile platform, a first signal strength data for a wireless device in the region;
determining, by the computing device, a first location of the wireless device in the region based on the first signal strength data; and
generating, by the computing device, a map indicating a location of the wireless device in the region based on the first spatial data and the first location of the wireless device.

2. The method of claim 1, further comprising:
receiving, by the computing device from the mobile platform, a second spatial data collected by the physical environment sensor;
determining, by the computing device, that a physical object is located at a second location in the region based on the second spatial data; and
updating the map, by the computing device, to include an indicator of the physical object at the second location.

3. The method of claim 1, wherein:
the computing device is a component of a central automation system located in a home;
the region is within the home; and
the central automation system receives data from a set of devices in the home comprising the mobile platform.

4. The method of claim 1, further comprising:
receiving, by the computing device from a different mobile platform that is remote from the computing device, a second spatial data in the region and a second signal strength data for the wireless device in the region;
determining, by the computing device, a second location of the wireless device based on the second signal strength data;
updating, by the computing device, the map based on the second spatial data and the second location of the wireless device.

5. The method of claim 1, further comprising:
receiving, by the computing device from a different mobile platform that is remote from the computing device, a second spatial data and a second signal strength data for the wireless device in the region;
determining, by the computing device, a second location of the wireless device based on the second signal strength data;
weighting, by the computing device, the second spatial data and the second location of the wireless device based on a reliability of the different mobile platform;
updating, by the computing device, the map based on the weighted second spatial data and the weighted second location of the wireless device.

6. The method of claim 1, wherein the first signal strength data comprises a signal strength vector indicating a direction of a received signal and strength of the received signal.

7. The method of claim 1, wherein the first signal strength data comprises a wireless device identifier for the wireless device.

8. The method of claim 1, wherein the generation of the map comprises accessing a prior map of the region and updating the prior map.

9. The method of claim 1, wherein the map comprises at least one selected from the group consisting of: a topographical map, a geographical map, and a floor plan.

10. The method of claim 1, wherein the map comprises a listing of wireless devices organized by regions.

11. The method of claim 1, wherein the map comprises an indication of disconnection of the wireless device from a wireless network, the indication comprising at least one selected from the group consisting of: an indication of a battery depletion or an indication of a faulty wireless card.

12. The method of claim 1, wherein the map comprises at least one selected from the group consisting of: an indication of differential spatial data of a physical object in the region and an indication of differential signal data of the wireless device.

13. The method of claim 1, wherein the generation of the map comprises:
    converting the first signal strength data into a three-dimensional graphical representation of the wireless device, and
    converting the first spatial data into a three-dimensional graphical representation of a physical device in the region.

14. The method of claim 1, wherein the generation of the map comprises:
    converting the first signal strength data into a three-dimensional graphical representation of the wireless device, and
    converting the first spatial data into a three-dimensional graphical representation of a physical device in the region,
        wherein the physical device comprises the wireless device.

15. The method of claim 1, wherein the region comprises an unstructured environment.

16. The method of claim 1, wherein the region comprises at least one selected from the group consisting of: an office, an office building, a home, and a hospital.

17. The method of claim 1, wherein the region comprises an outdoor environment.

18. The method of claim 1, wherein the mobile platform comprises at least one selected from the group consisting of: a home cleaning device, a delivery platform, a self-driving vehicle, and an autonomous monitoring device.

19. A system comprising:
a processor; and
a non-transitory, computer-readable medium in communication with the processor and storing instructions that, when executed by the processor, cause the processor to perform operations comprising:
    receiving, by a computing device from a mobile platform that is remote from the computing device, a first spatial data in a region,
        wherein the mobile platform is configured to navigate the region autonomous from human assistance based on a spatial data obtained from a physical environment sensor of the mobile platform;
    receiving, by the computing device from the mobile platform, a first signal strength data for a wireless device in the region;
    determining, by the computing device, a first location of the wireless device based on the first signal strength data;
    generating, by the computing device, a map indicating a location of the wireless device in the region based on the first spatial data and the first location of the wireless device.

20. A non-transitory, computer-readable medium storing instructions that, when executed by a processor, cause the processor to perform operations comprising:
    receiving, by a computing device from a mobile platform that is remote from the computing device, a first spatial data in a region,
        wherein the mobile platform is configured to navigate the region autonomous from human assistance based on a spatial data obtained from a physical environment sensor of the mobile platform;
    receiving, by the computing device from the mobile platform, a first signal strength data for a wireless device in the region;
    determining, by the computing device, a first location of the wireless device based on the first signal strength data;
    generating, by the computing device, a map indicating a location of the wireless device in the region based on the first spatial data and the first location of the wireless device.

* * * * *